July 29, 1930.    L. L. KING    1,771,794
LIQUID LEVEL INDICATOR
Filed Oct. 2, 1926    3 Sheets-Sheet 1
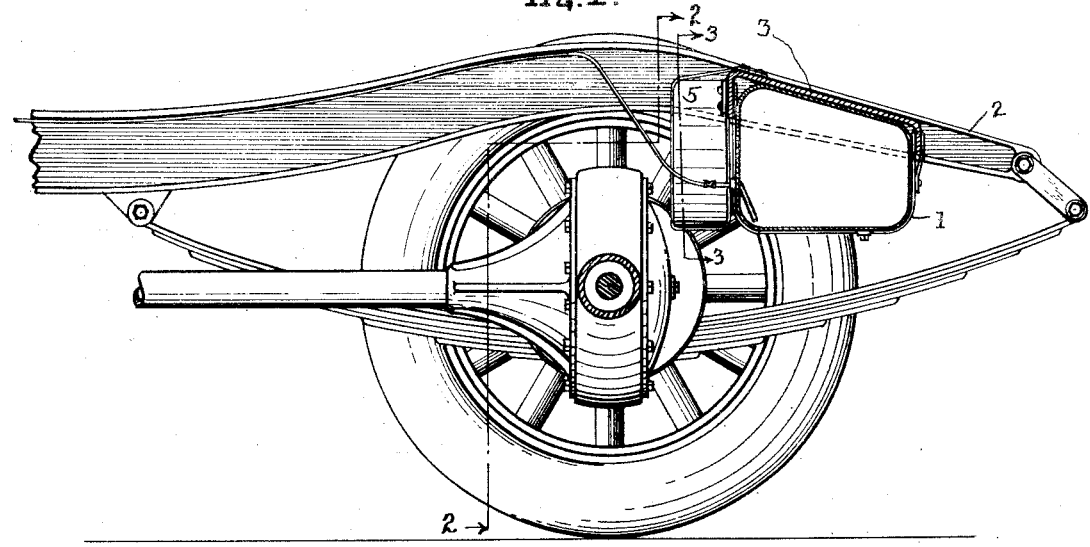
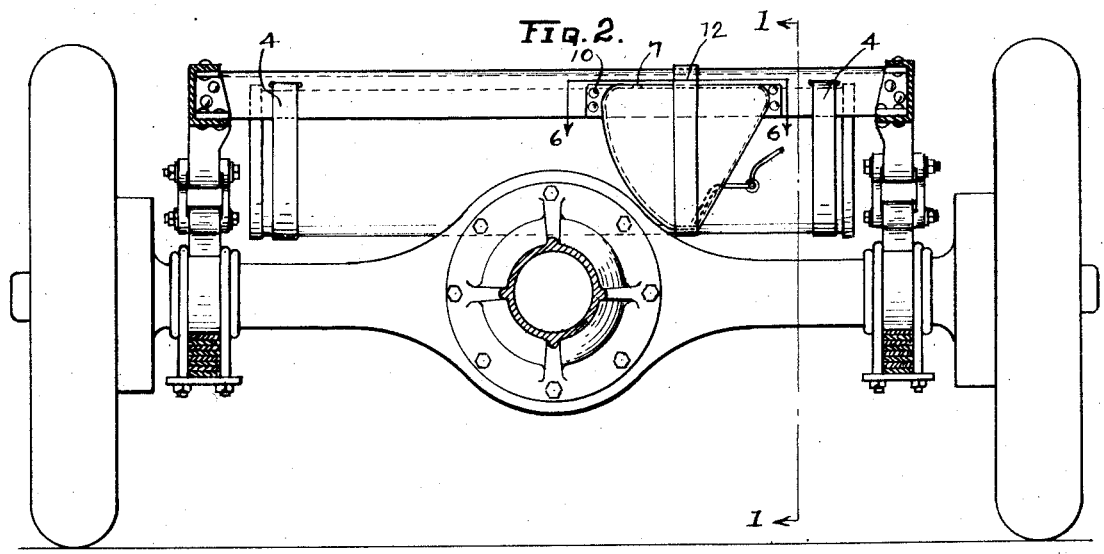
INVENTOR
Lucian L. King
by Evans & McCoy
ATTORNEYS.

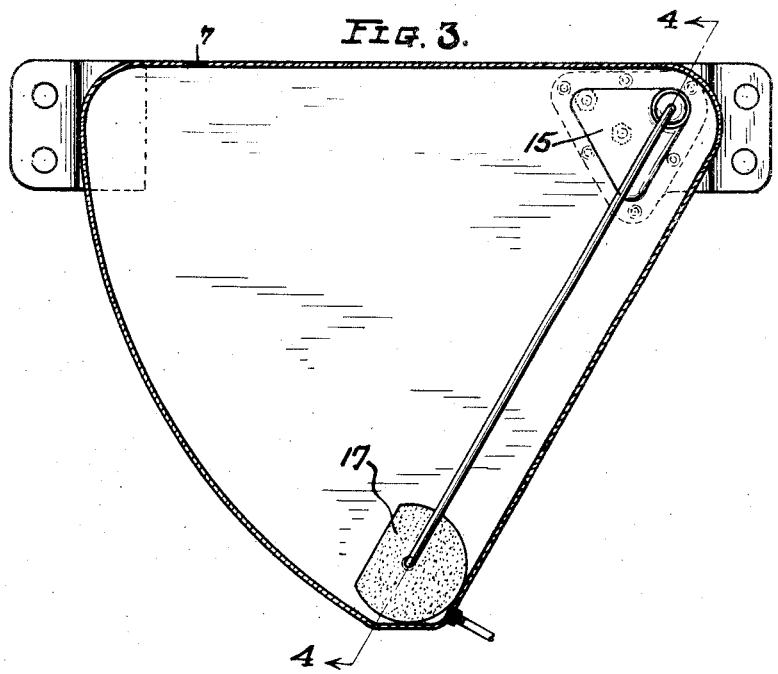
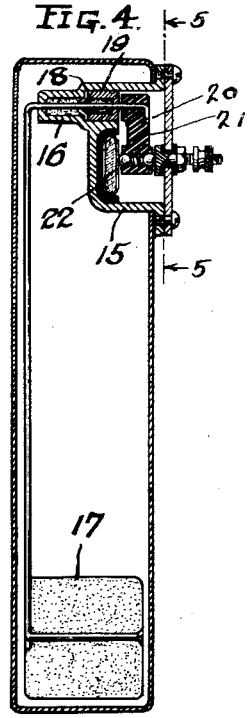
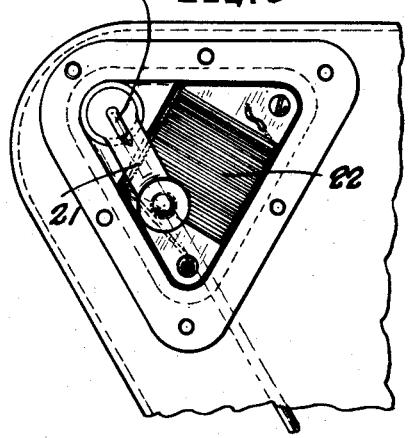
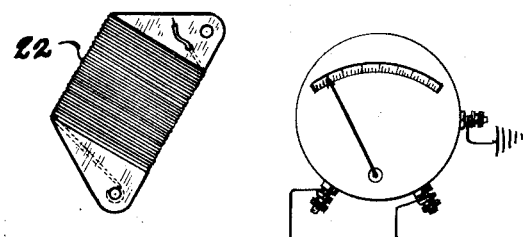
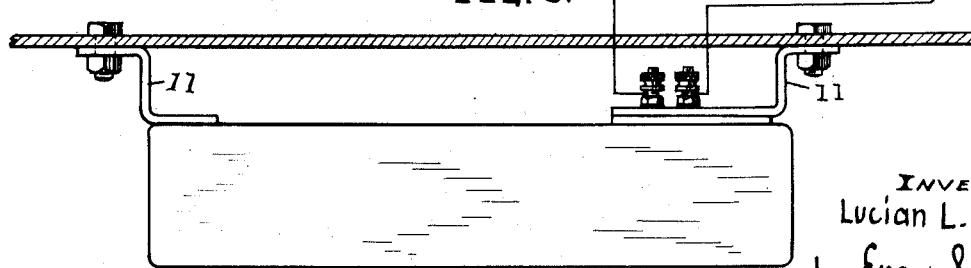

July 29, 1930. L. L. KING 1,771,794
LIQUID LEVEL INDICATOR
Filed Oct. 2, 1926  3 Sheets-Sheet 3
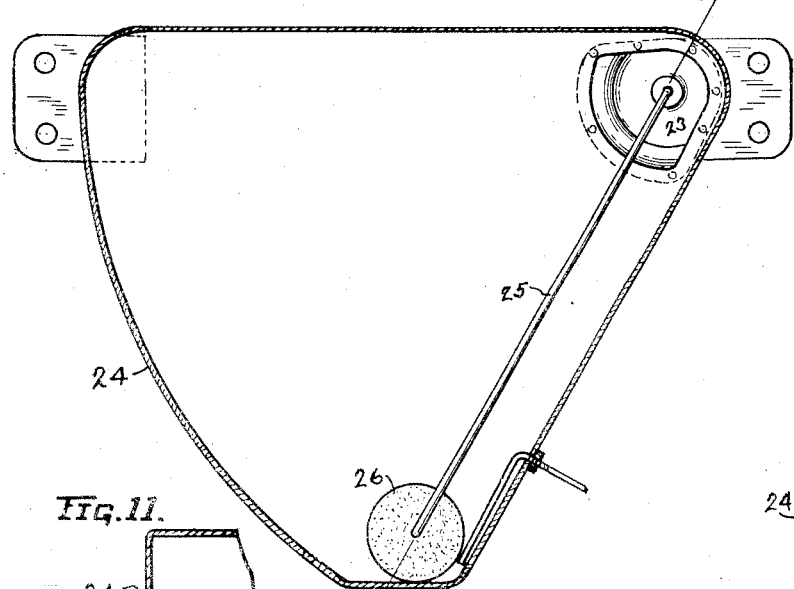
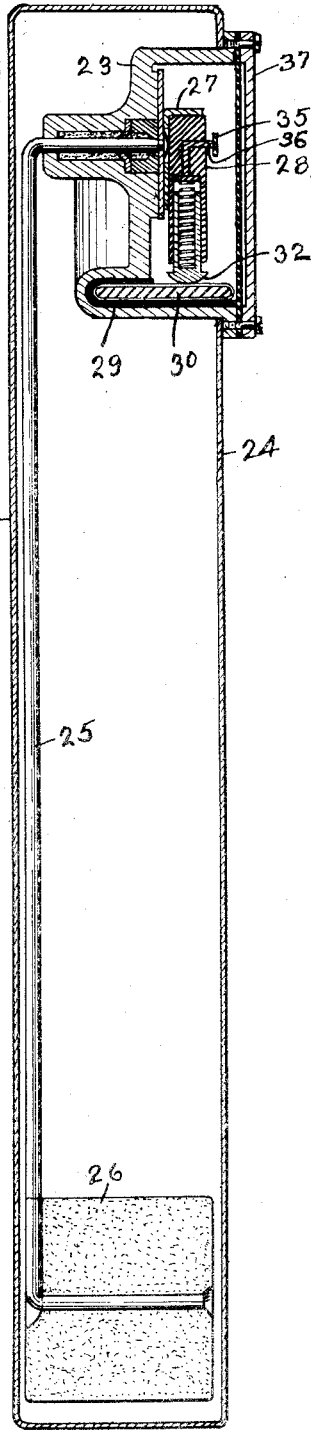
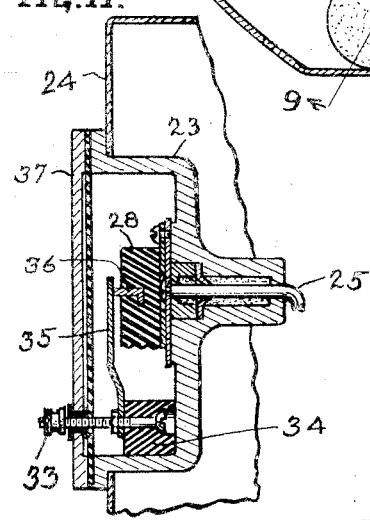
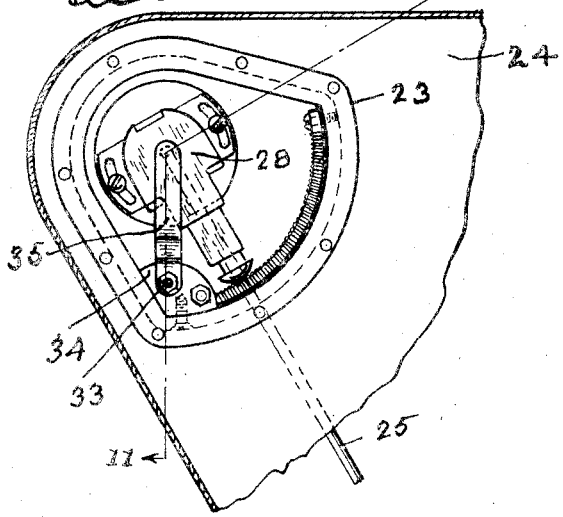
Inventor
Lucian L. King
by Evans & McCoy
Attorneys.

Patented July 29, 1930

1,771,794

UNITED STATES PATENT OFFICE

LUCIAN L. KING, OF AKRON, OHIO, ASSIGNOR TO THE CLEVELAND TRUST COMPANY, OF CLEVELAND, OHIO, A CORPORATION OF OHIO

LIQUID-LEVEL INDICATOR

Application filed October 2, 1926. Serial No. 139,065.

This invention relates to liquid level indicators for use in connection with automotive vehicles and particularly to a liquid level actuated indicator that indicates to the operator of the vehicle the quantity of fuel contained in the fuel tank thereof.

The great variety of fuel tank sizes and shapes and also the internal baffling of the fuel tanks render it very difficult to provide a standard form of indicator that can be used for the tanks of the different makes of automotive vehicles.

The present invention contemplates the use of a relatively small capacity supplemental tank that has the float actuated mechanism mounted therein and that is so connected with the main fuel tank as to receive fuel therefrom through an intermediate connection that will give substantially the same level of fuel in the supplemental tank as in the main tank. The particular utility of the invention comes from the ability to mount the level indicating mechanism in the supplemental tank before it is installed on the automotive vehicle.

One of the objects of the invention is to provide a convenient and relatively foolproof liquid level indicating mechanism that can be conveniently mounted on different makes of cars after the car is completely assembled.

An additional object of the invention is to provide a liquid level indicating device that can be used as original equipment on a great number of fuel tanks of different dimensions on automotive vehicles of different makes, the principal modification in the tank being the selection of the proper depth of the supplemental tank to meet the particular needs of the vehicle on which the installation is being made.

Another object of the invention is to provide a liquid level indicating mechanism that can be completely assembled on the bench and in which the operating parts are thoroughly protected during the handling of the instrument after it leaves the assembly bench. This makes it very desirable for sale to the general trade for use as supplemental equipment on automotive vehicles and the like.

These and other objects of the invention will be apparent from a consideration of the accompanying drawings wherein:

Figure 1 is a longitudinal sectional view of a vehicle chassis taken on line 1—1 of Fig. 2, showing one application of the invention.

Fig. 2 is a transverse sectional view of the vehicle chassis shown in Fig. 1 and taken substantially on line 2—2 thereof.

Fig. 3 is an enlarged vertical cross sectional view of the supplemental tank shown as installed in Fig. 1 and Fig. 2 and taken substantially on line 3—3 of Fig. 1.

Fig. 4 is a sectional view of the supplemental tank shown in Fig. 3 that is taken substantially on line 4—4 of Fig. 3 looking in the direction of the arrows.

Fig. 5 is a view of the float actuated mechanism with the cover removed, taken substantially on line 5—5 of Fig. 4.

Fig. 6 is a sectional view taken substantially on line 6—6 of Fig. 2 showing a preferred mounting for the supplemental tank and diagrammatically indicating the connections with a dash supported indicator.

Fig. 7 is a view of the rheostat element removed from the casing of the rheostat.

Fig. 8 is a sectional view of a modified form of the invention.

Fig. 9 is an enlarged sectional view of the rheostat and tank shown in Fig. 8 taken substantially on line 9—9 thereof and showing a preferred internal construction of the rheostat unit.

Fig. 10 is an enlarged face view, with supplemental tank parts broken away, of the rheostat shown in Fig. 9 with the cover plate removed; and Fig. 11 is a sectional view taken substantially on line 11—11 of Fig. 10 showing the internal arrangement of the rheostat.

Although the invention is herein shown in its preferred form as of the electrical indicating type, it will be obvious that any other suitable type of instrument could be used with satisfaction, the primary element of the invention being the use of a supplemental tank for completely housing the mechanical parts of the indicating mechanism prior to the assembly of the mechanism in an automotive vehicle. These features provide an instrument that is adapted for ready installation on a great number of cars in which the fuel tanks are approximately of the same depth.

Fig. 1 and Fig. 2 show a sectional view of a conventional form of chassis embodying a fuel tank 1 that is supported from the frame 2 of the vehicle by a transversely extending protecting channel plate 3 that is secured to the channel members of the side frames and a pair of supporting straps 4 that extend around the fuel tank 1 and are secured to the channel plate 3. Applicant's invention consists in providing a supplemental tank 5 of substantially the same depth as the main fuel tank 1 and that can conveniently be mounted adjacent the main fuel tank to house the operating mechanism for the liquid level indicator. The supplemental tank 5 is shown as held in place by a series of rivets or bolts 10 that connect supporting brackets 11 of the supplemental tank 5 to the channel plate. A strap 12 is supported from the channel plate 3 in substantially the same manner as the corresponding strap 4 that serves to support the fuel tank 1. The supplemental tank 5 has an opening 13 that is formed in the top thereof to permit the level of fuel in the supplemental tank to rise to the same elevation as the fuel contained in the main tank 1, the supplemental tank 5 being connected to the main tank 1 by direct connection to the supply line by any suitable connector 6. Since the two tanks are of substantially the same vertical depth, and since they are each provided with a breather hole 7, the level of fuel in the main tank will correspond closely with the level of fuel in the supplemental tank.

Float operated mechanism 14 that controls the movement of the indicator is mounted within the supplemental tank. This mechanism is shown as of the electrical type although the invention in its broader aspects also contemplates the use of any other type of indicating mechanism wherein all of the mechanism is housed in a single supplemental tank that can be mounted on and connected to the main fuel tank for convenience in installation.

The rheostat mechanism herein shown comprises a base 15 that has a bearing part 16 formed thereon that pivotally supports the operating end of the arm of a float 17. A small leather gasket 18 is preferably interposed between the filled cavity of the bracket and a suitable bearing bushing 19 prevents leakage of fuel into the rheostat chamber. The outer end of the float carrying arm is bent to an angle to form a portion 20 that secures the insulated arm 21 in place and provides a contact device of relatively low frictional resistance for operating over a wound rheostat unit 22.

The remainder of the mechanism will be apparent to those skilled in the art since it comprises only a float of cork or other suitable actuating device that is controlled by changes in the level of liquid in the supplemental tank.

A modification of the rheostat mechanism that is particularly adaptable to use on automotive vehicles on which a high degree of accuracy is desired in the indicator is shown in Figs. 8 to 11, inclusive.

The housing 23 is soldered or otherwise secured to the side wall 24 of the supplemental tank. The supplemental tank is supported in any desired manner from the vehicle chassis in the immediate vicinity of the main fuel tank. The housing 23 pivotally supports a float arm 25 that has a float 26 on one end thereof and a seat 27 on the other end thereof for supporting an insulated contact member 28. The housing also has an arcuate groove 29 formed therein to receive the wound resistance element 30 as shown in section in Fig. 9 and in elevation in Fig. 10. The resistance element 30 is formed of a large number of turns of enameled high resistance wire that is preferably wound transversely about a flat elongated core with the turns abutting and that has the internal contacting face smoothed by passing the rheostat between pressure rolls and also by having the enamel buffed from the contacting zone that is traversed by the yielding contact shoe 32 which is carried by the insulated arm 28. The contact shoe 32 is electrically connected with a terminal post 33 that is mounted in an insulating block 34 through a yielding contact finger 35 that is also supported from the block 34 and a contact pin 36 that is embedded in the insulating arm 28 and electrically connected with the spring pressed contact shoe 32 to insure positive electrical connection between the elements of the resistance unit and the contact member.

The terminal post 33 also extends through an insulated opening in the cover plate 37 of the rheostat mechanism and serves to assist in holding the cover plate in position.

It will be apparent from a consideration of the foregoing rheostat mechanism, that the supplemental tank can readily be supported adjacent the main tank and connected therewith through the gasoline supply pipe by the ordinary garage mechanic. This avoids all adjustment of sensitive instrument parts, insures proper assembly of the indicator mechanism and provides an indicator unit that can readily be applied by the user of the vehicle.

What I claim is:

1. In an automotive vehicle the combination with a main fuel tank, of a removable supplemental tank of relatively small capacity secured to and positioned closely alongside the main fuel tank, a permanently open connection between the bottom portion of the main fuel tank and the supplemental tank whereby the level of liquid in each tank will be substantially the same, fuel level actuated mechanism mounted within the supplemental tank and responsive to changes in the level of fuel therein, a fuel level indicator mounted remote from and independently of the main and supplemental tanks and controlled by said fuel level actuated mechanism to indicate at the remote point the level of fuel in the main tank.

2. In an automotive vehicle, the combination with a fuel tank of a supplemental tank removably mounted alongside and closely adjacent to the fuel tank, said supplemental tank being of relatively small capacity and of substantially the same vertical depth as said fuel tank, a permanently open connection between the bottom portion of the fuel tank and the bottom portion of the supplemental tank whereby the level of liquid in each tank will be maintained substantially the same, and fuel level responsive mechanism mounted in the supplemental tank and connected with a remotely positioned visible indicator whereby the level of fuel in the main tank is approximately indicated by the level of fuel in said supplemental tank.

3. In an automotive vehicle, the combination with a fuel tank, of a self contained detachably mounted unit alongside the fuel tank and closely adjacent thereto, said unit comprising a relatively small supplemental tank having a float actuated mechanism mounted therein, said supplemental tank having a permanently open connection with said fuel tank whereby the liquid in the supplemental tank is maintained at substantially the same level as the liquid in the fuel tank, an independently mounted indicating device remote from said unit, and means for controlling said indicating device from said float actuated mechanism.

In testimony whereof I affix my signature.

LUCIAN L. KING.